(12) United States Patent
Tsinberg et al.

(10) Patent No.: US 8,930,610 B2
(45) Date of Patent: Jan. 6, 2015

(54) SYSTEM AND METHOD FOR TRANSMITTING CONTROL SIGNALS OVER HDMI

(71) Applicant: Key Digital Systems, Inc., Mount Vernon, NY (US)

(72) Inventors: Mikhail Tsinberg, New York, NY (US); Leon G. Tsinberg, Bronx, NY (US); Ilsoo Yu, Fort Lee, NJ (US)

(73) Assignee: Key Digital Systems, Inc., Mount Vernon, NY (US)

( * ) Notice: Subject to any disclaimer, the term of this patent is extended or adjusted under 35 U.S.C. 154(b) by 0 days.

(21) Appl. No.: 14/269,737

(22) Filed: May 5, 2014

(65) Prior Publication Data

US 2014/0240593 A1    Aug. 28, 2014

Related U.S. Application Data

(63) Continuation-in-part of application No. 13/630,749, filed on Sep. 28, 2012, now abandoned.

(51) Int. Cl.
*G06F 3/06* (2006.01)
*H04N 5/44* (2011.01)
*H04N 7/015* (2006.01)
*G06F 5/00* (2006.01)

(52) U.S. Cl.
CPC ............. *H04N 5/4401* (2013.01); *H04N 7/015* (2013.01)
USPC ........... 710/315; 710/2; 710/5; 710/8; 710/11

(58) Field of Classification Search
None
See application file for complete search history.

(56) References Cited

U.S. PATENT DOCUMENTS

2009/0177818 A1*  7/2009  Shim et al. ..................... 710/100
2013/0219087 A1*  8/2013  Du ................................. 710/16

* cited by examiner

*Primary Examiner* — Scott Sun
(74) *Attorney, Agent, or Firm* — Dickstein Shapiro LLP

(57) ABSTRACT

A device for transmitting multiple control formats from an audio/video source to an audio/video monitor receiver. The device includes a high definition multimedia interface cable that has a plurality of communication channels, including a consumer electronic control channel. Furthermore, a pair of plugs are coupled to the respective ends of the high definition multimedia interface cable and can be coupled to audio/video sources and receivers. A pair of interface ports are further coupled to the high definition multimedia interface cable and communicatively coupled to the consumer electronic control channel. The device transmits a first control format on the consumer electronic control channel when the input port is not coupled to a switching device and transmits a second control format on the consumer electronic control channel when the input port is coupled to a switching device.

13 Claims, 6 Drawing Sheets

| 3.5mm MONO PHONE JACK ||  CEC/IR CONNECTION |
|:-:|:-:|:-:|
| C1 | C2 | |
| 2 | 2 | SOURCE-> SINK |
| 2 | 1 | SOURCE->C2 |
| 1 | 2 | C1->SINK |
| 1 | 1 | C1->C2 |

FIG. 3

| 3.5mm STEREO PHONE JACK ||  CEC/IR/TxD CONNECTION | ARC/RxD CONNECTION |
| --- | --- | --- | --- |
| C1 | C2 | | |
| 2 | 2 | SOURCE<->SINK | SOURCE<- SINK |
| 2 | 1 | SOURCE ->C2 | SOURCE<- C2 |
| 1 | 2 | C1<->SINK | C1<->SINK |
| 1 | 1 | C1<->C2 | C1<->C2 |
| <-> =BIDERECTIONAL, -> =UNIDERECTIONAL, <- =UNIDERECTIONAL ||| RS232 =TxDRxD |

FIG. 5

SYSTEM AND METHOD FOR TRANSMITTING CONTROL SIGNALS OVER HDMI

CROSS-REFERENCE TO RELATED APPLICATIONS

This application is a continuation-in-part application of U.S. patent application Ser. No. 13/630,749, filed on Sep. 28, 2012, the contents of which are incorporated herein by reference into the present application.

BACKGROUND OF THE INVENTION

1. Field of the Invention

The present invention relates to a device for transmitting multiple control formats on an high definition multimedia interface.

2. Description of the Related Art

High-Definition Multimedia Interface ("HDMI") is a compact audio/video interface for transferring uncompressed video data and compressed or uncompressed digital audio data from a HDMI-compliant source device to a compatible computer monitor, video projector, digital television, or digital audio device. HDMI provides an interface between any compatible digital audio/video ("A/V") source device, such as a set-top box ("STB") or set-back box ("SBB"), a DVD player, a PC, a video game system, an A/V receiver, and a compatible digital audio and/or video monitor device, such as a television ("TV") or a digital television ("DTV"). HDMI solves the problem of "too many cables" in A/V systems. Audio, visual, status and control information may be transmitted via one cable in the system. HDMI supports all HDTV formats (e.g., 720p, 1080i, 1080p) along with support for up to eight channels of digital audio.

HDMI has three physically separate communication channels, which are the DDC, TMDS and the optional CEC. Consumer Electronic Control ("CEC") is a protocol used to control devices that are attached to the HDMI cable. HDMI, supports CEC features, command sets, and CEC compliance tests. CEC features may include routing control, standby, system information, and feature abort. Other, optional features may include one touch recording, deck control, tuner control, On Screen Display (OSD) display, OSD name transfer, device menu control, RC pass-through, power status and vendor-specific commands. Using a single HDMI cable, CEC control enables a user to control all HDMI devices with a remote control or commander user interface, including powering on or off connected devices and general commands initiated by devices to other devices. It thus solves the problem of "too many remote controls or commanders." One limitation of using the CEC channel of conventional HDMI cables is that only a single control format can be transmitted over the HDMI cable from the audio/video (A/V) source device to a compatible digital audio and/or video monitor device.

Accordingly, the present control marketplace includes a need for driving HDMI commensurate with other control standards. The present invention solves the problem of driving multiple control standards over a high definition multimedia interface.

SUMMARY OF THE INVENTION

The present invention provides a device and method for transmitting multiple control formats from an audio/video source to an audio/video monitor receiver. The device includes a high definition multimedia interface cable that has a plurality of communication channels, including a consumer electronic control channel. Furthermore, a pair of plugs are coupled to the respective ends of the high definition multimedia interface cable and can be coupled to audio/video sources and receivers. A pair of interface ports are further coupled to the high definition multimedia interface cable and communicatively coupled to the consumer electronic control channel. The device transmits a first control format on the consumer electronic control channel when the input port is not coupled to a switching device and transmits a second control format on the consumer electronic control channel when the input port is coupled to a switching device.

BRIEF DESCRIPTION OF THE DRAWINGS

The features, objects, and advantages of the present disclosure will become more apparent from the detailed description set forth below when taken in conjunction with the drawings in which like reference characters identify correspondingly elements and in which:

FIG. 3 illustrates a logic table for the interface ports disclosed in the HDMI connector of FIGS. 1 and 2.

FIG. 5 illustrates a logic table for the interface ports disclosed in the HDMI connector of FIG. 4.

DETAILED DESCRIPTION OF THE PREFERRED EMBODIMENT

In the following detailed description, reference is made to certain embodiments. These embodiments are described with sufficient detail to enable those skilled in the art to practice them. It is to be understood that other embodiments may be employed and that various structural, logical, and electrical changes may be made.

Figure 1:
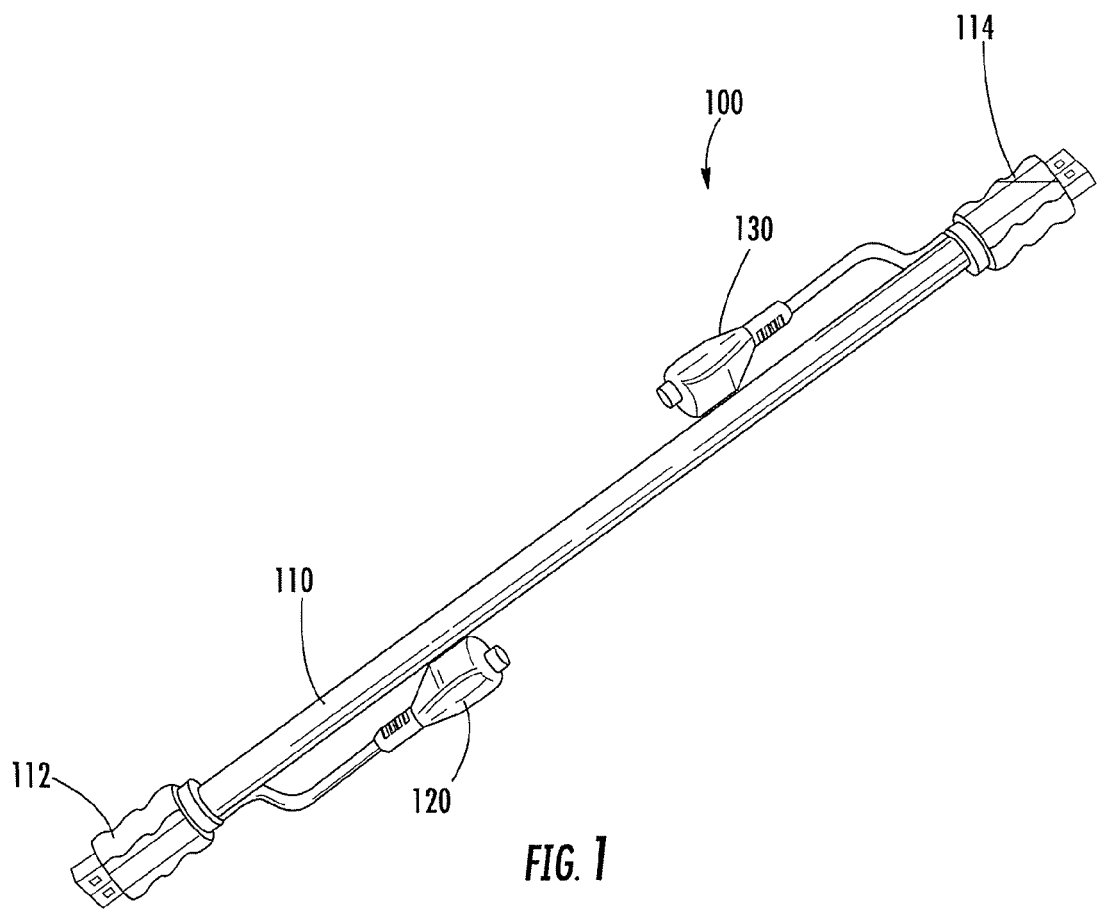
FIG. 1 illustrates a modified HDMI connector according to a first exemplary embodiment of the present invention.

FIG. 1 illustrates a modified HDMI connector 100 according to a first exemplary embodiment of the present invention. The exemplary HDMI connector 100 includes a conventional HDMI cable 110 with an embedded variant control line (i.e., a CEC channel), which is discussed in more detail below with respect to FIG. 2. The HDMI connector 100 also includes an additional pair of interface ports 120 and 130 that enables the HDMI connector 100 to transmit multiple control signals from two or more devices connected to the respective HDMI cable plugs 112 and 114. For example, cable plug 112 can be connected to a standard A/V receiver and cable plug 114 can be connected a television or similar audio/video monitor device. The modified HDMI cable 110 enables multiple control signals (e.g., consumer electronics control, infrared signals, and the like) to be transmitted over the CEC channel.

In the first exemplary embodiment, interface port 120 can be coupled to a format switcher, such as mono audio format switcher or a master control device with switching capability (e.g., the KD-MC2500 master controlled manufactured by Key Digital Systems), which is capable of generating an infrared signal to be transmitted to the television. In particular, such an infrared signal may be generated by the format switch in response to a signal received from a remote control device or the like. Since interface port 120 of the HDMI connector 100 is coupled to the format switch, the HDMI connector 100 is configured to transmit the infrared signal on the embedded variant control line, as will be discussed in more detail with respect to FIG. 2. Furthermore, interface port 130 can be coupled to an IR cable flasher that can be positioned near the television. As a result, when the format switch generates an infrared control signal that is transmitted on the embedded variant control line, the IR cable flasher will generate a corresponding signal output to the television.

Figure 2:
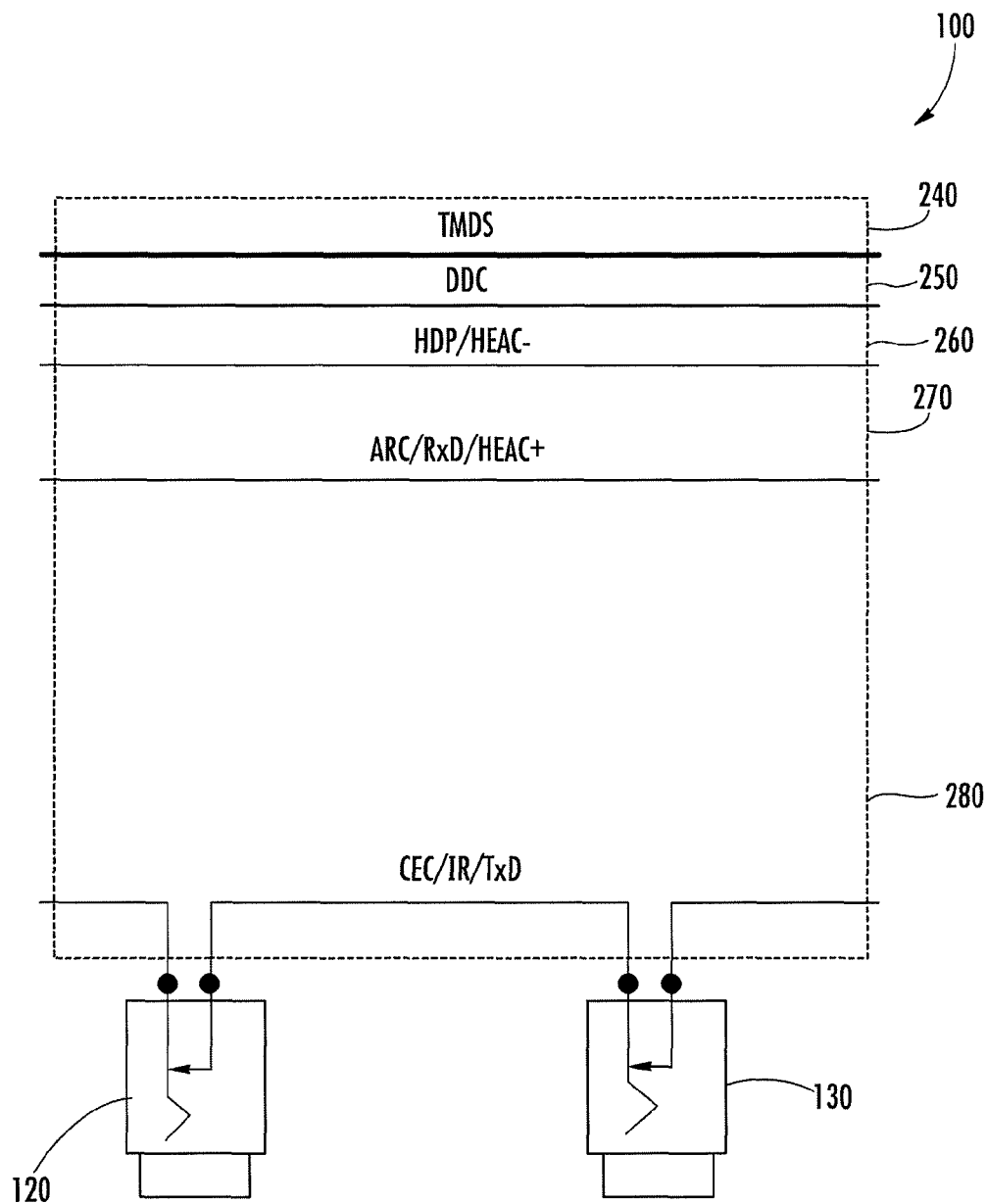
FIG. 2 illustrates a schematic view of the HDMI connector illustrated in FIG. 1 and according to the first exemplary embodiment of the present invention

FIG. 2 illustrates a schematic view of the HDMI connector 100 illustrated in FIG. 1 and discussed above, according to the first exemplary embodiment of the present invention. As shown in FIG. 2, each layer of HDMI connector 100 represents a different HDMI line or channel internal to the HDMI connector 100. For example, the HDMI connector 100 includes Transition Minimalized Differential Signal ("TDMS") 240, Display Data Channel ("DDC") 250 and Hot Plug Detection ("HDP") and HDMI Ethernet and Audio Return Channel ("HEAC") 260 discussed above. The function and purpose of these channel is well known to one skilled in the art and will not be discussed in detail herein. Furthermore, the HDMI connector 100 includes Audio Return Channel ("ARC") 270 and Consumer Electronic Control ("CEC") signal line 280.

In the first exemplary embodiment, the CEC signal line 280 is utilized as the embedded variant control line discussed above. Further, in this exemplary embodiment, interface ports 120 and 130 are implemented as 3.5 millimeter (or seven halves millimeter) mono audio phone jack (also referred to as "C1" and "C2", respectively), although it should be appreciated that such embodiment it not so limited to audio phone jacks. Interface ports 120 and 130 are configured to be switched into either an ON or OFF state depending on the connection being made upon the port. For example, when interface port 120 is coupled to the format switcher, the ON position is activated that results in a communication path between the format switcher and the CEC signal line 280 of the HDMI connector 100. Thus, CEC signal line 280 is modified by the format switcher transmitting infrared signals, for example. It should be appreciated that the schematic illustrated for interface port 120 is shown for illustrative purposes. Thus, one skilled in the art would understand that when the interface port 120 is not plugged into the format switcher, the CEC signal line 280 of HDMI connector 100 is receiving a signal directly from a source connected to cable plug 112 (e.g., an A/V receiver or the like) because the interface port 120 is not activated.

Likewise, when the interface port 130 is plug into an output device, such as an IR cable flasher or the like, the modified HDMI connector 100 transmits a signal to the IR cable flasher via the CEC signal line 280. If the interface port 130 is not coupled to an output device, the CEC signal line 280 transmits a signal directly to the output coupled to plug 114, e.g., a television or the like (i.e., a "sink").

FIG. 3 illustrates a logic table for interface ports 120 and 130 (also referred to and shown as C1 and C2, respectively) when the ports are plugged into a device (i.e., the ON state) or not plugged into a device (i.e., the OFF state). The first row illustrates when both ports C1 and C2 are in the OFF state and the signal on the CEC signal line 280 is transmitted from the source (e.g., A/V receiver) to the sink (e.g., the television). The second row of the logic table illustrates when port C1 is in the OFF state and port C2 is in the ON state such that the signal on the CEC signal line 280 is transmitted from the source (e.g., A/V receiver) to the port C2 (e.g., coupled to the IR cable flasher). The third row of the logic table illustrates when port C1 is in the ON state and port C2 is in the OFF state such that the signal on the CEC signal line 280 is transmitted from the port C1 (e.g., format switcher) to the sink (e.g., television). The fourth row of the logic table illustrates when both ports C1 and C2 are in the on state and the signal on the CEC signal line 280 is transmitted between the two ports. Accordingly, the modified HDMI connector 100 is configured to transmit multiple types of controls signals over the CEC signal line 280 depending on the state of ports C1 and C2.

Figure 4:
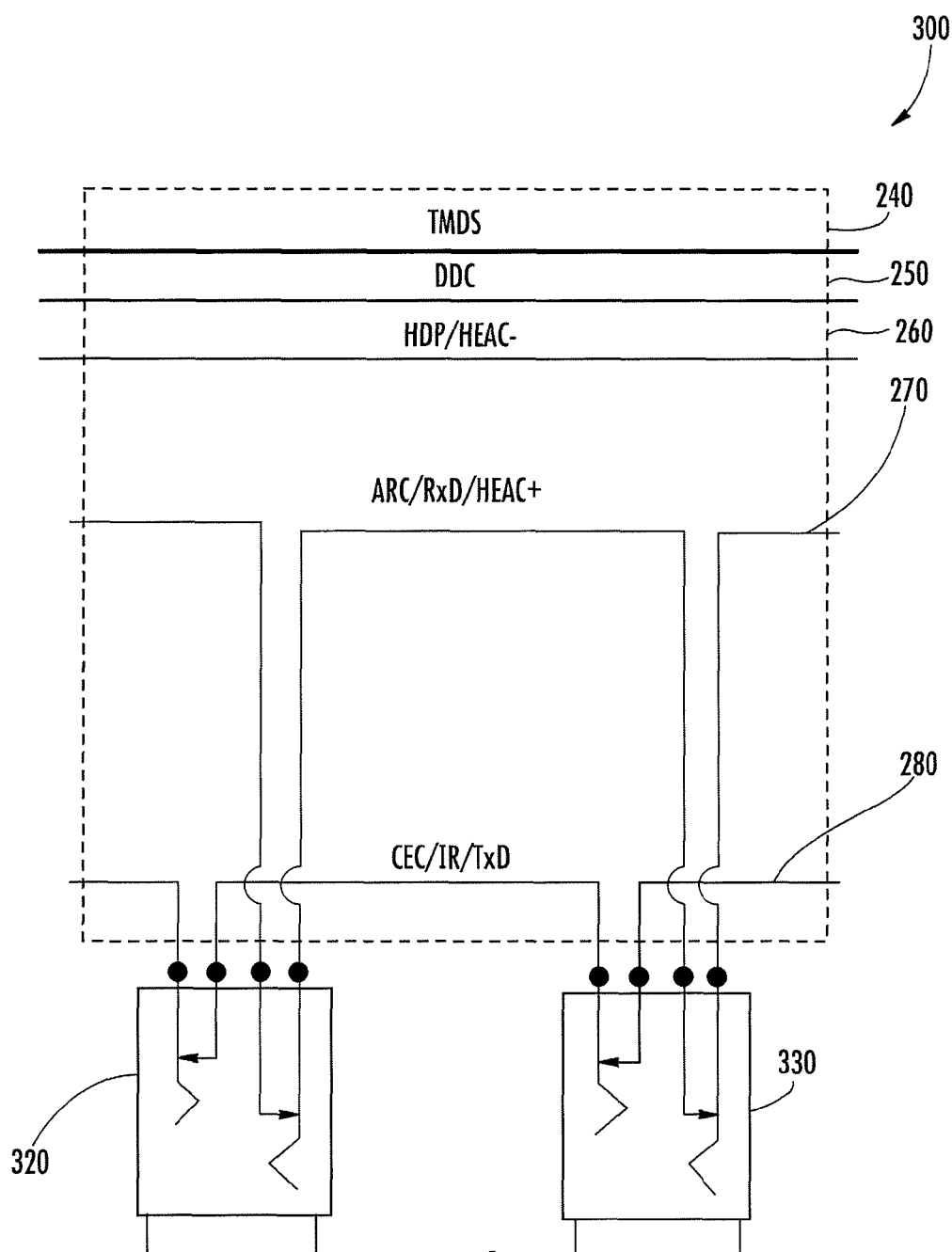
FIG. 4 illustrates a second exemplary embodiment of an HDMI connector in accordance with the present invention.

FIG. 4 illustrates a second exemplary embodiment of an HDMI connector 300 in accordance with the present invention. The components described above with respect to FIG. 2 are generally the same as shown in FIG. 4 and will not be described in detail herein. However, HDMI connector 300 is configured to transmit an RS-232 signal instead of an infrared signal as disclosed above with respect to the first exemplary embodiment. In particular, the HDMI connector 300 employs both ARC signal line 270 and CEC signal line 280 to transmit the RS-232 signal from interface port 320 to interface port 330. As shown, each interface port 320 and 330 includes a pair of internal switches. Similar to interface ports 120 and 130, these switches are activated or in the ON state when the respective port is plugged into a device, such as a format switcher. When unplugged, the switches are in the OFF state or deactivated. It should be appreciated that interface port 320 can be plugged into a format switcher (e.g., the KD-MC2500 master controlled manufactured by Key Digital Systems) or the like. Likewise, interface port 330 can plugged into an RS-232 jack of a television, a device to control the RS-232 communication with the television or the like. Further, it should be appreciated that HDMI connector 300 functions similarly to HDMI connector 100 described above, except that HDMI connector 300 is configured to transmit RS-232 signals instead of infrared signals. Accordingly, the specific functionality of HDMI connector 300 will not otherwise be described herein with respect to FIG. 4.

It should be appreciated that the CEC signal line 280 in the modified HDMI connector 300 is configured to transmit consumer electronics control signals, including signals transmitted via the RS-232 standard and derived transmitter signals (TxD) therefrom. The signal derived transmitter signal (TxD) is present as a standard interference of the control signal input into the HDMI connector 300 when the interface port 320 is activated (i.e., plugged into the format switcher).

FIG. 5 illustrates a logic table for interface ports 320 and 330 (also referred to and shown as C1 and C2, respectively) when the ports are plugged into a device (i.e., the ON state) or not plugged into a device (i.e., the OFF state). Similar to the logic table illustrated in FIG. 3, the pathway for the ARC signal line 270 and the CEC signal line 280 signal line will be either from port C1 to port C2, C1 to sink, source to sink, or source to port C2 as illustrated in the table of FIG. 5. In other words, based on whether interface ports 320 and 330 are plugged in/coupled to a device, the respective switches in the ports will be activated or deactivated. Accordingly, the same logic illustrated in FIG. 3's table applies to the modified HDMI connector 300 illustrated in FIG. 4 and the logic table of FIG. 5.

Figure 6:
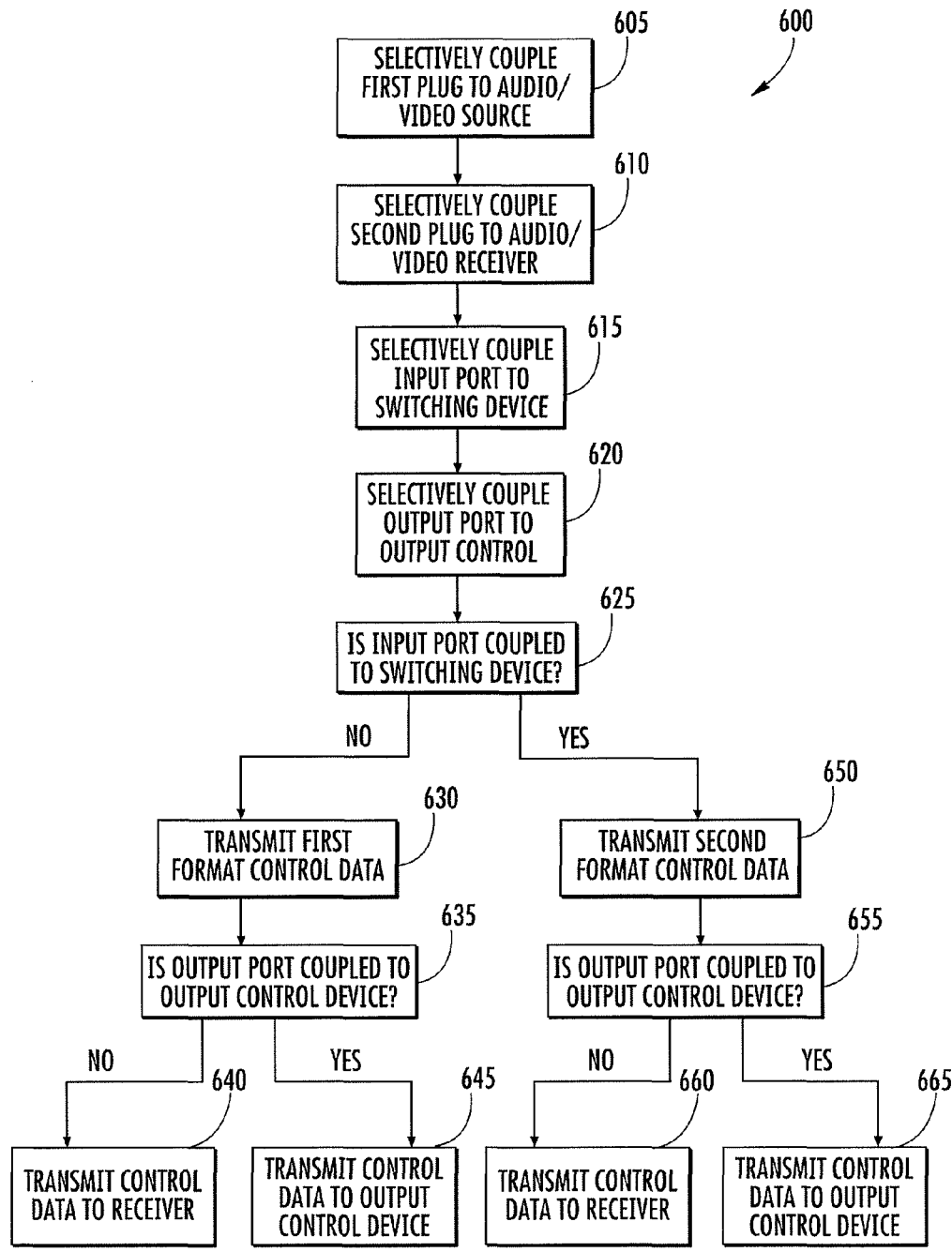
FIG. 6 illustrates a method for transmitting multiple control formats from an audio/video source to an audio/video monitor receiver in accordance with an exemplary embodiment of the present invention.

FIG. 6 illustrates a method 600 for transmitting multiple control formats from an audio/video source to an audio/video monitor receiver in accordance with an exemplary embodiment of the present invention. As shown, in Step 610, a first plug 112 of a HDMI connector 100 can be selectively coupled to an audio/video source. At Step 620, a second plug 114 of the HDMI connector 100 can be selectively coupled to an audio/video receiver. At Step 630, an input port 120 of the HDMI connector 100 can be selectively coupled to a switching device. At Step 640, an output port 130 of the HDMI connector 100 can be selectively coupled to an output control device (e.g., an IR cable flasher). It should be appreciated that each of these steps can be selectively performance by a technical engineer installing or reconfiguring an audio/video system in a residence or the like.

Once the plugs and interface ports are selectively coupled to the respective devices, the multiple control formats are transmitted over the CEC signal line 280 of the HDMI connector 100 as follows. Step 625 illustrates whether the first or second format control data will be transmitted over the CEC signal line 280. As discussed above, if the input port 120 is not coupled to the switching device, the method proceeds to Step 630 in which the first format control data received from the A/V receiver, for example, is transmitted towards the audio/video receiver. Step 635 illustrates whether the data is transmitted directly to the receiver (Step 640) or to the output control device (Step 645). It should be appreciate that such steps are performed in accordance with the logic table illustrated in FIG. 3 and discussed above.

Returning to Step 625, if the input port 120 is coupled to the switching device, the method proceeds to Step 650 in which the second format control data received from the format switcher, for example, is transmitted towards the audio/video receiver. Step 655 illustrates whether the data is transmitted directly to the receiver (Step 660) or to the output control device (Step 665). Again, it should be appreciate that such steps are performed in accordance with the logic table illustrated in FIG. 3 and discussed above. Finally, it is noted and should be appreciated to those skilled in the art that the same method can be applied to the second embodiment of the present invention illustrated in FIG. 4 and discussed above.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings.

What is claimed is:

1. A device for transmitting multiple control formats from an audio/video source to an audio/video monitor receiver, the device comprising:
a high definition multimedia interface medium having a plurality of communication channels, including a consumer electronic control channel;
a first plug configured to be coupled to the audio/video source and communicatively coupled to the plurality of communication channels;
a second plug configured to be coupled to the audio/video receiver and communicatively coupled to the plurality of communication channels;
an input port configured to be coupled to a switching device and communicatively coupled to the consumer electronic control channel; and
an output port configured to be coupled to an output control device and communicatively coupled to the consumer electronic control channel,
wherein the consumer electronic control channel transmits first control format data towards the audio/video receiver when the input port is not coupled to a switching device, and
wherein the consumer electronic control channel transmits second control format data towards the audio/video receiver when the input port is coupled to a switching device.

2. The device of claim 1, wherein the switching device is a mono audio format switcher.

3. The device of claim 1, wherein the input port and the output port are each three and one half millimeter phone jack.

4. The device of claim 1, wherein when the input port is coupled to the switching device and the output port is coupled to the output control device, the high definition multimedia interface transmits the second control format data from the switching device to the output control device via the consumer electronic control channel.

5. The device of claim 1, wherein when the input port is coupled to the switching device and the output port is not coupled to the output control device, the high definition multimedia interface transmits the second control format data from the switching device to the audio/video receiver via the consumer electronic control channel.

6. The device of claim 1, wherein when the input port is not coupled to the switching device and the output port is not coupled to the output control device, the high definition multimedia interface transmits the first control format data from the audio/video source to the audio/video receiver via the consumer electronic control channel.

7. The device of claim 1, wherein the input port and the output port are each mono audio form connectors.

8. The device of claim 1, wherein the high definition multimedia interface medium is a conventional HDMI cable modified by the input port and the output port.

9. The device of claim 1, wherein the output control device is an IR cable flasher device.

10. A method for transmitting multiple control formats from an audio/video source to an audio/video monitor receiver, the method comprising:
selectively coupling a first plug of a HDMI medium to the audio/video source;
selectively coupling a second plug of the HDMI medium to the audio/video receiver;
selectively coupling an input port attached to the HDMI medium to a switching device;
selectively coupling an output port attached to the HDMI medium to an output control device;
transmitting first control format data via a consumer electronic control channel of the HDMI medium towards the audio/video receiver when the input port is not coupled to a switching device; and
transmitting second control format data via the consumer electronic control channel towards the audio/video receiver when the input port is coupled to a switching device.

11. The method of claim 10, further comprising transmitting the second control format data from the switching device to the output control device via the consumer electronic control channel when the input port is coupled to the switching device and the output port is coupled to the output control device.

12. The method of claim 10, further comprising transmitting the second control format data from the switching device to the audio/video receiver via the consumer electronic control channel when the input port is coupled to the switching device and the output port is not coupled to the output control device.

13. The method of claim 10, further comprising transmitting the first control format data from the audio/video source to the audio/video receiver via the consumer electronic control channel when the input port is not coupled to the switching device and the output port is not coupled to the output control device.

* * * * *